Oct. 24, 1933.　　W. A. REICHEL ET AL　　1,931,852
CONTROL METHOD AND APPARATUS
Filed March 14, 1929　　3 Sheets-Sheet 1

Oct. 24, 1933.  W. A. REICHEL ET AL  1,931,852
CONTROL METHOD AND APPARATUS
Filed March 14, 1929   3 Sheets-Sheet 2

Oct. 24, 1933.  W. A. REICHEL ET AL  1,931,852
CONTROL METHOD AND APPARATUS
Filed March 14, 1929  3 Sheets-Sheet 3

Inventors
Atherton H. Meart and
Wladimir A. Reichel
Cornelius D. Ehret
By their Attorney.

Patented Oct. 24, 1933

1,931,852

UNITED STATES PATENT OFFICE 1,931,852

CONTROL METHOD AND APPARATUS

Wladimir A. Reichel and Atherton H. Mears, Philadelphia, Pa.; said Mears assignor to Leeds & Northrup Company, Philadelphia, Pa., a corporation of Pennsylvania Application March 14, 1929. Serial No. 347,098

13 Claims. (Cl. 250—41.5)

Our invention relates to a method of and apparatus for effecting a control in accordance with change in the magnitude of a condition.

In accordance with our invention, there is produced in response to change in magnitude of a condition an electric current whose magnitude is dependent upon the extent of change of said condition generally from a predetermined standard; and furthermore said current is selectively applied for effecting a plurality of controls.

Further in accordance with our invention, there is provided an element, more particularly an electrical element, which is movable in response to comparatively small changes in magnitude of a condition, and said element actuates or controls light reflecting means for directing a continuous or fluctuating beam of light upon light-sensitive means; and furthermore the resulting continuous or pulsating current traversing said means is utilized either directly or indirectly, to effect energization of electro-magnetic means, more particularly an electric motor or motors for controlling movable structure.

More particularly in accordance with our invention, the electrical element responsive to changes in magnitude of a condition comprises a galvanometer having mounted with respect thereto a reflecting element, as a mirror, for directing a constant or periodically interrupted beam of light, whose intensity varies in accordance with deflections of said galvanometer, from any suitable source upon a light sensitive cell; and furthermore a uniform or a pulsating current of predetermined frequency traversing said cell is preferably amplified to desired magnitude and caused to flow through a control circuit of small impedance to said current.

Our invention further resides in a method and apparatus of the character hereinafter described and claimed.

In effecting a control in response to change in magnitude of a condition, there has heretofore been utilized apparatus wherein transmission of movement between a deflecting member, or the like, actuated in response to change in magnitude of a condition, and structure for recording or controlling said condition is effected mechanically through members having an appreciable amount of inertia. Apparatus of the above character may function adequately and efficiently in cases where the condition to be recorded or controlled varies appreciably in magnitude and at a comparatively slow rate. When, however, the variations in the condition are minute or occur rapidly, another type of control apparatus becomes necessary, since the comparatively rugged or massive deflection mechanisms for transmitting mechanical movement heretofore used have a relatively large inertia, and so require an appreciable force to actuate the same. There is, therefore, inherent in the type of control system above referred to a lack of sensitivity and quickness of action, and as a result a considerable time lag is involved in effecting a control in response to changes in magnitude of the condition. Accordingly there is a real need for control apparatus, and by way of example, recording apparatus for registering relatively slow transient phenomena that cannot be recorded to advantage by oscillographs, and which occur too rapidly for the type of apparatus mentioned above.

Our invention comprehends a control system and apparatus wherein a deflecting member is actuated in response to comparatively small changes in magnitude of a condition, and effects control, through or by means of a substantially massless medium, of movable structure, thereby dispensing with mechanical transmission structure and the consequent disadvantages associated therewith.

For a further understanding of our invention, reference is to be had to the accompanying drawings, in which.

Figures 1, 2:
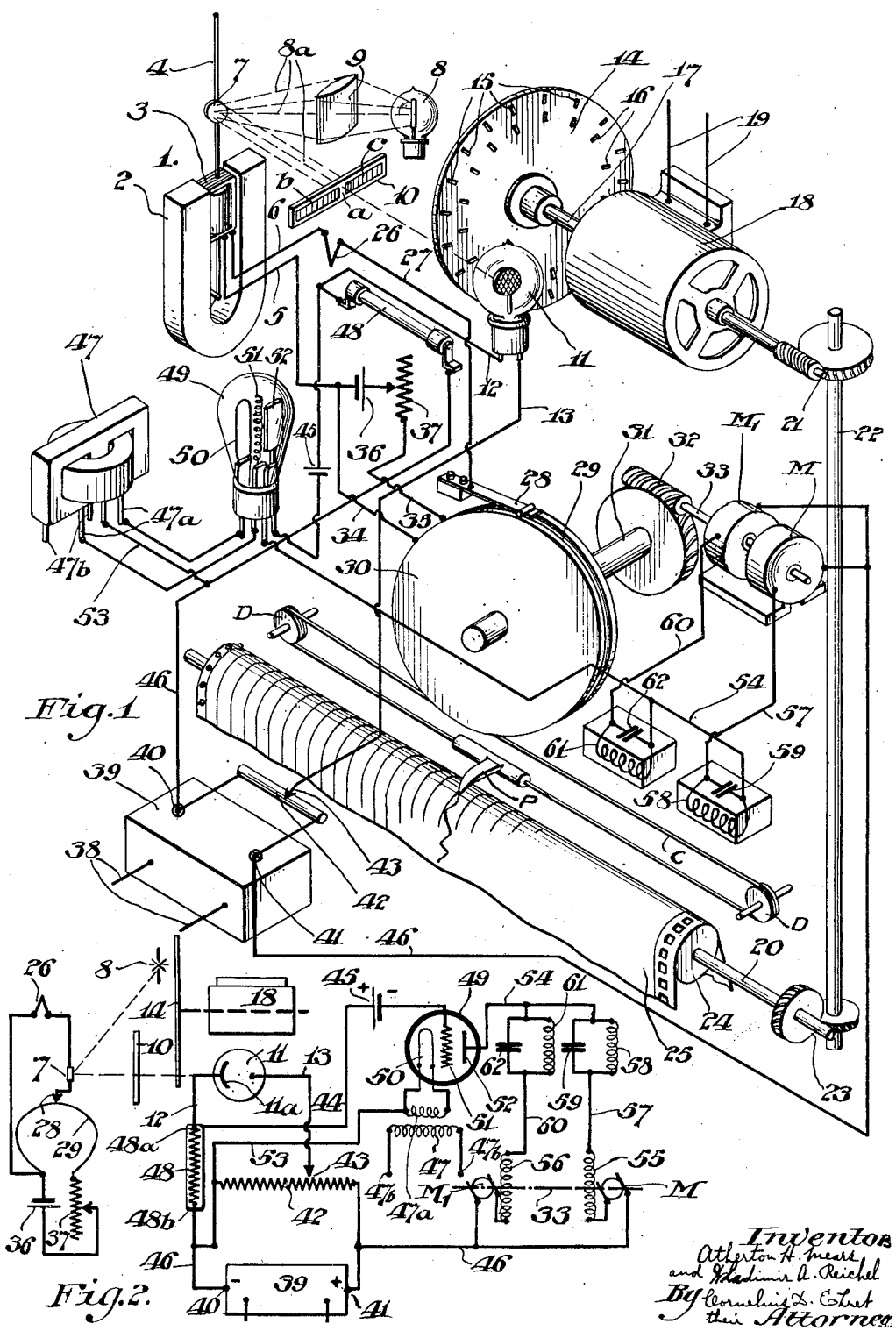
Fig. 1 is a schematical illustration of a control system.
Fig. 2 is a diagrammatic illustration of the system shown in Fig. 1.

Referring to the system illustrated in Fig. 1, a galvanometer 1 comprising a stationary permanent magnet 2 and a movable coil 3 suspended by torsion wire or flexible element 4, is connected by conductors 5 and 6 in a circuit hereinafter described. Member 4 has a torsional moment applied thereto by rotation of movable coil 3, and has mounted thereon a reflecting element 7, as a mirror, for example. A source of light 8, which may be an electric lamp or equivalent, is disposed a predetermined distance from mirror 7, and interposed therebetween is a lens 9, as of the cylindrical type, for converging rays of light 8a from source 8 upon mirror 7.

When moving coil 3 is in its neutral de-energized position as illustrated in Fig. 1, light rays from source 8 are directed by the mirror upon the central opaque portion of a light screen 10. Screen 10 is so constructed that as the light rays are directed in either direction from its center, light of varying intensity passes through the screen, the intensity increasing as the angle of deflection from the center increases. Accordingly, screen 10 may comprise gratings b and c of graduated thickness between which the light passes, or may comprise a transparent screen whose opaqueness is graduated from the opaque center portion a toward their remote ends.

A light sensitive cell 11, as a selenium or photo-electric cell, is disposed in the path of the reflected light rays, and is in line with the opaque portion a of screen 10 and mirror 7 so that light is transmitted to the photo-electric cell 11 only when mirror 7 is in other than its neutral or mid position. Photo-electric cell 11 may be of any suitable type, and has the well known characteristic that the electrical resistance between its anode and cathode varies inversely as the intensity of light projected upon said cell. The cell is connected by conductors 12 and 13 to an electric circuit hereinafter described.

Interposed between screen 10 and cell 11 is a disc 14 having apertures 15 and 16 disposed in different concentric rows near its periphery. The number of apertures 15 per unit of angle appreciably exceed in number the apertures 16 for a purpose hereinafter explained. Disc 14 is mounted on shaft 17 driven by constant speed motor 18 which is energized from any suitable source through conductors 19. Motor 18 also actuates a shaft 20 through gearing 21, counter shaft 22 and gearing 23, shaft 20 having mounted thereon cylinder 24 upon which is carried a recorder chart or sheet 25 hereinafter described.

Disc 14 is so disposed with respect to screen 10 and cell 11 that deflection of mirror 7 in one direction from its neutral position will cause light rays to pass through screen b and intermittently through apertures 15, comprising the outer row (assuming disc 14 to be rotating at a predetermined constant speed), and upon deflection in the opposite direction from its neutral position will cause light rays to pass intermittently through screen c and through aperatures 16 comprising the inner row, in either case effecting a varying resistance of cell 11.

Galvanometer 1 is connected by conductor 6 to an element 26, as a thermo-couple for example, which is connected by conductor 27 to a stationary resilient contact 28 bearing upon a slide wire resistance 29. Resistance 29 is mounted upon disc 30 rotatably carried by shaft 31. Disc 30 is actuated in either direction through gearing 32 and shaft 33 on which are mounted motors M and M1 controlled in a manner hereinafter described. The terminals of slide wire resistance 29 are connected by conductors 34 and 35 to a source of potential 36 and an adjustable resistance 37 respectively. Source 36 is also connected to the galvanometer by a conductor 5.

A source of alternating current potential is connected through conductors 38 to rectifying apparatus 39 of the type commonly known as a "B-eliminator" or rectifier-filter system. Apparatus 39 may obviously be dispensed with if a direct current source of suitable value is available, or any other suitable rectifying apparatus may be utilized. Output or supply terminals 40 and 41 have connected across the same a resistance 42 of such magnitude that the short circuit current through the same is negligible. A voltage tap comprising adjustable contact 43, connects resistance 42 to conductor 13 with one terminal of cell 11. Terminal 40 is connected through conductor 46 to the secondary of transformer 47, and to one terminal of high resistance 48.

Mounted upon shaft 31 of the slide wire disc 30, and rotatable therewith, is a disc or pulley (not shown) for actuating a cord or other flexible member C. Member C carries a recording element or marker P, and is guided by pulleys D so that it moves longitudinally of the axis of cylinder 24 to produce a record upon chart 25.

Referring now to Fig. 2, high resistance 48 has one terminal connected to cathode 11a of cell 11 by conductor 12, and the other terminal to one side of the voltage source. Conductor 13 connects the anode of cell 11 to the voltage tap 43 so that cell 11 is included in a circuit comprising, in series, resistance 48 and the source of potential determinable by the position of adjustable tap 43.

A thermionic device 49, as an electric valve or audion amplifier, having a heated cathode 50, a grid 51 and an anode 52, co-operates with cell 11 considerably to amplify the current passing through cell 11. To this effect, one terminal 48a of resistance 48 is connected by conductor 44, in which is included a suitable source of biasing potential 45, to grid 51 of the electric valve. Cathode 50 is heated by current from a source of alternating current through transformer 47, whose primary terminals are indicated at 47b, and the secondary of which, 47a, is connected by a conductor 53 to the other terminal 48b of the resistance. Anode 52 is connected by conductor 54 to a plurality of filter circuits, i. e. resonant circuits which have a maximum impedance at a particular frequency of current traversing the same. These circuits are connected in parallel with each other in the anode circuit, and each is connected in series with an operating winding of a motor in a manner presently described.

Motors M and M1 have their rotors keyed to a common shaft 33, and are so connected in the parallel resonant circuits above referred to that an equal division of direct current through these circuits causes the respective rotors to oppose each other with equal force, whereupon shaft 33 remains practically stationary. Motors M and M1 are preferably of the a. c. series type and of construction reducing frictional losses to a minimum. When one motor is energized to a greater extent than the other, it will obviously overcome the opposition of the other motor and rotate shaft 33 in a corresponding direction. Winding 55 of motor M has one terminal connected by conductor 46 to the filament 50, and the other terminal connected by conductor 57 to one of the aforesaid filter or resonant circuits comprising inductance 58 and capacitance 59 connected in parallel with respect to each other and in series with winding 55 in the plate circuit of amplifying tube 49. Winding 56 of motor M1 is connected by conductor 60 to the other filter circuit comprising inductance 61 and capacitance 62, also connected in parallel with respect to each other and in series with winding 56 in the plate circuit of amplifying tube 49. The values of capacitance 59 and inductance 58 are fixed and have such values that the circuit has a maximum impedance, i. e. is resonant, at a frequency of current determined by one of the rows of apertures in disc 14. The circuit comprising capacitance 62 and inductance 61 in the same manner, is resonant only at the frequency determined by the other row of apertures in disc 14. In order that current at a predetermined frequency will pass through the proper control circuit, the values of inductance and impedance in the various circuits are preferably such that the circuits will be resonant only at frequencies differing to an appreciable extent.

The method of operation is as follows:—

Assuming now that the potentiometer circuit, or equivalent, shown in Fig. 2 is unbalanced due to the variation of potential across the terminals of element 26, there will occur a deflection of the galvanometer in direction and of extent in accordance with the direction and magnitude of change of said potential. Mirror 7 is accordingly rotated in the same direction as the movable element of the galvanometer, and directs the rays of light 8a converged thereon to an off center portion of screen 10. It will now further be assumed that the potential across element 26 has increased, and that deflection of mirror 7 causes rays 8a to pass through the left screen b, as viewed in Fig. 1, thereby causing pulsating or more properly, intermittent, rays of light to strike cell 11 at a certain frequency through apertures 15. As previously stated, motor 18 which drives disc 14 operates at known constant speed and accordingly the rates of pulsations in the light rays passing through apertures 15 or 16 are fixed but differ between themselves.

Referring now to Fig. 2, it will be apparent that as the resistance of cell 11 varies in magnitude and at a rate according respectively to the intensity and rate of pulsations of the light rays transmitted thereto, there will correspodingly be set up in the circuit comprising cell 11, conductor 13, source of potential tapped from resistance 42, high resistance 48 and conductor 12, a pulsating current whose magnitude varies in accordance with the resistance of cell 11. This current, however, is of small magnitude, as compared with the magnitude of current required for actuating control apparatus, and is preferably amplified to a predetermined extent by a thermionic device 49, such as a power tube, or any suitable number of them in cascade. The grid circuit of the power tube, as previously explained, is connected across the terminals of resistance 48, and as the potential across said resistance varies in accordance with the current traversing the same, there will be applied to the grid circuit of the power tube a fluctuating potential whose magnitude and rate of fluctuation is in accordance with the resistance of cell 11 and direction of deflection of the galvanometer 1. The anode or plate circuit of the power tube, in the system illustrated by Fig. 2, includes the aforesaid filter circuits, connected in parallel therein, and the operating windings of motors M and M1. Due to the well known action of the thermionic electric valve, a variation in potential of the grid circuit produces a corresponding magnified change of current in the plate circuit. There will accordingly be produced in the anode or plate circuit of power tube 49 a fluctuating current whose frequency, in the present instance, corresponds to the speed of motor 18 and the number of apertures 15, and whose magnitude, other things being constant, depends upon the extent of deflection of light rays 8a from the center a of light screen 10.

Assuming now that the filter circuit comprising inductance 58 and capacitance 59 is resonant at this particular frequency, it follows, due to the high impedance of the circuit which theoretically is infinite, that the anode circuit traversed by the fluctuating current comprises conductor 54, filter circuit 61—62, conductor 60 and motor winding 56. The alternating or fluctuating component of the current will not flow through the filter circuit 58—59 to an appreciable extent due to its practically infinite impedance at this frequency. The effective current through field winding 56 being greater than that through 55, motor M1 will be actuated in opposition to motor M on the common shaft 33 and through gearing 32 and shaft 31 effect rotation of disc 30 in such direction that the resistance of slide wire 29 in circuit with element 26 is varied so as to compensate for the increase in potential across terminals of element 26. When this value of resistance has been reached, the potentiometer or equivalent circuit is again in balance with the result that galvanometer 1 returns to its neutral position. Accordingly, the light rays are directed only upon the opaque portion a of screen 10, and cell 11 is not affected by the light rays. There will, however, be a certain small amount of continuous or direct current in the photo-electric cell circuit, since its resistance is not infinite at comparatively low intensities of light. This current, however, will be steady and will have no fluctuating component as heretofore, and so whatever current is amplified by the power tube will flow in substantially equal amounts through the filter circuits, and motor windings 55 and 56. Since these windings are opposed, in the sense that they tend to cause motors M and M1 to run in opposite directions, there will be no rotation of the control shaft 31 and it will remain at rest until a further variation in potential occurs across the terminals of element 26, thereby causing unbalance of the potentiometer circuit and deflection of mirror 7. Due to the fact that variation in magnitude of potential of element 26 produces corresponding extents of rotation of slide wire disc 30 in order to balance the potentiometer circuit, the extent of rotation of disc 30, or shaft 31, may be taken as a measure of the said change in potential, and to this end the marker or recording element P is moved transversely on chart 25 by a cord or other flexible element C connected to shaft 31.

Upon decrease in potential across terminals of element 26, coil 3 of the galvanometer will deflect in the opposite direction from that previously assumed, and light rays will pass through the right side c of screen 10, and through apertures 16 to produce a varying pulsating current of different frequency in the circuit of cell 11. As in the previous instance, this current is amplified by thermionic valve 49, but due to the fact that its frequency is considerably different, it will flow through that portion of the anode circuit comprising filter circuit 58—59, conductor 57 and winding 55 of motor M, thereby effecting rotation of shaft 33, control shaft 31 and slide wire disc 30 in a direction opposite to that previously described.

Accordingly, slide wire resistance 29 is automatically adjusted so as to compensate for variations in potential of element 26, and to thereby effect balancing of the potentiometer, or equivalent circuit, such as a Wheatstone bridge, for example. Furthermore, since cylinder 24, upon which the record sheet 25 is mounted, is driven at substantially constant speed by motor 18, it will be apparent that the record produced by marker P will not only show the magnitude of variation of the potential of element 26, but also its rate of change.

Figure 3:
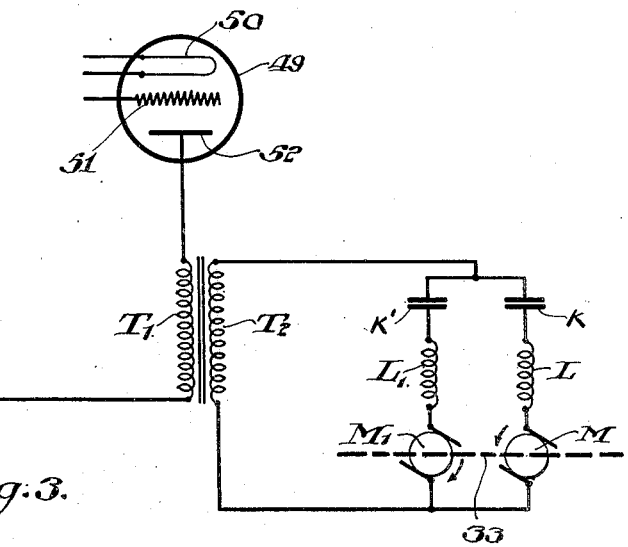
Fig. 3 is a diagrammatic illustration of another form of control system.

In Fig. 3, there is shown a preferred form of our invention, wherein the amplifying device or power tube 49 has connected in its plate circuit the primary T1 of a transformer, the secondary of which, T2, is connected in parallel with a pair of series resonant circuits. The connections to the power tube 49 are substantially identical to those shown in Fig. 2, except that the plate circuit comprises only the primary T1 of a transformer, instead of a pair of control circuits in parallel. One of the series resonant circuits comprises a capacitance K1 and an inductance L1, both in series with motor M1, preferably of the A. C. series type. The other series resonant circuit comprises a capacitance K and inductance L, both in series with motor M, also preferably of the A. C. series type. Motors M and M1 are mounted on a common shaft 33, and when energized by current through the corresponding control circuit oppose each other in the sense that they tend to rotate shaft 33 in opposite directions. Accordingly, an equal division of current through the two motor circuits would result in an equal balance of forces and rotation of shaft 33 would not result.

In practice, the values of the capacitances and inductances of the circuits are chosen so that the circuit comprising capacitance K1 and L1 is resonant at the frequency of current produced by one row of apertures in disc 14, and the circuit comprising capacitance K and L is resonant at the frequency of current determined by the other row of apertures. In order that the D. C. component of the plate current may be eliminated from the series resonant circuits, the transformer comprising the primary T1 and secondary T2 is utilized to separate and step up to a suitable magnitude the alternating or fluctuating component of the plate current. This feature has obvious advantages, since the D. C. component, if permitted to flow through the motor circuits, would divide equally so as to cause motors M and M1 to equally oppose each other. By separating the fluctuating or alternating current component from the D. C. component, it is possible to direct only the useful current through the proper motor circuit and so eliminate unnecessary heating losses. In the example shown, the inductances L and L1 comprise the operating windings of motors M and M1 respectively, this arrangement being permitted by the use of series resonant circuits.

Assuming that the circuit comprising motor M is so adjusted that it is resonant at the frequency determined by the row of apertures 16 in disc 14, the resulting transformed fluctuating current at this frequency will pass with minimum impedance through capacitance C and the inductance or motor winding L of the motor M to energize the same and rotate shaft 33 in the proper direction. The control disc driven by shaft 33 is adjusted in the manner illustrated in Fig. 1. If the frequency of the fluctuating component of the plate current is determined by apertures 15, the circuit comprising M1, which is resonant at this frequency is traversed by the transformed fluctuating current component and accordingly motor M1 is energized to rotate shaft 33 in the direction opposite to that above described.

Figures 4, 5:
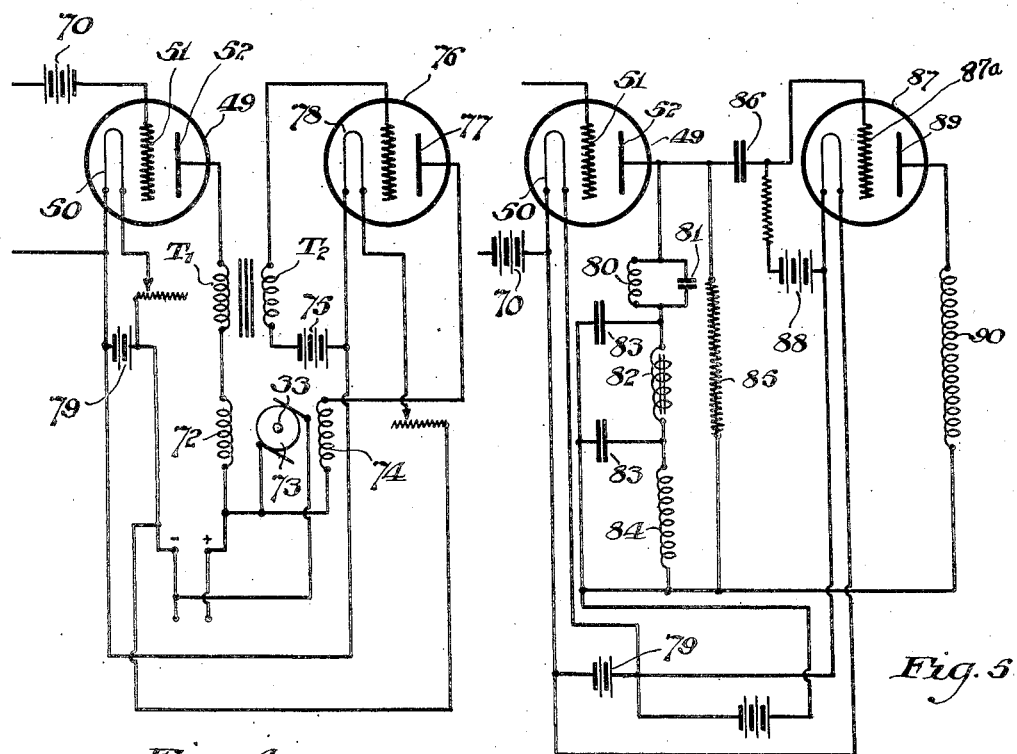
Fig. 4 is a diagrammatic illustration of a modified form of control system.
Fig. 5 is a diagrammatic illustration of another modified form of control system.

In Fig. 4, there is shown a system for utilizing a single motor, wherein the control current may be either continuous or fluctuating at a predetermined frequency. The amplifying or power tube 49 is connected as above described in the photo-electric cell circuit, except for the fact that the grid biasing potential 70 is of such magnitude that it cuts off the flow of current in the plate circuit when the photo-electric cell is dark. The current traversing the photo-electric cell circuit, referring to Fig. 7, will be either continuous or fluctuating, depending on the direction of deflection of the galvanometer mirror 7. The disc 14 is provided with a single row of apertures 71 adjacent its periphery, but spaced therefrom. The light screen 10, together with mirror 7 and the source of light 8, are disposed at one side of disc 14, and the photo-electric cell 11 is disposed adjacent the opposite side, so that either a fluctuating beam of light through apertures 71, or a continuous beam of light past the edge of disc 14 may be directed thereon. When the beam of light falls upon the disc between its periphery and apertures 71, the cell will be dark and no current will flow therethrough.

Referring again to Fig. 4, the plate circuit of the power tube comprises the primary T1 of a transformer having a secondary T2, the primary winding T1 being in series with a field winding 72 of a motor 73. Motor 73 is of the double-field reversible type, the armature of which is connected to a D. C. source as illustrated, and whose other field winding 74 opposes winding 72 in the sense that it tends, when energized, to rotate the motor in the opposite direction. The circuit of the secondary winding T2 comprises a grid biasing potential 75 and an electric valve or amplifying device 76. The biasing potential 75 cuts off all current in the plate circuit of valve 76 when no appreciable electromotive force is induced in secondary T2. The plate circuit 77 of the valve is connected in series with the field winding 74, and filament 78 is heated by current from source 79, which also supplies current to filament 50 of tube 49.

Assuming that the beam of light falling upon cell 11 is continuous, as where the beam is deflected beyond the edge of the disc, the grid biasing potential 70 is opposed to permit a substantially continuous flow of current through the plate circuit of power tube 49. Since this current has no appreciable rate of change, it will flow through the primary T1, and through the field winding 72 without inducing noticeable electro-motive force in the secondary T2. Accordingly, the biasing potential 75 prevents flow of current in the plate circuit of valve 76 comprising the opposing field winding 74. The current traversing field winding 72 therefore effects rotation of motor 73, which is mounted on shaft 33, in the corresponding direction, to operate slide wire disc 30. In order that motor 73 shall rotate under influence of winding 72, it is necessary that the field winding be energized by a current representative of the full value of the continuous current when the cell is light.

If, however, the current in the photo-electric cell is fluctuating, due to the beam of light passing through apertures 71, a corresponding fluctuating current traverses the primary T1 and field winding 72 of the plate circuit of tube 49. Accordingly, there will be induced in the secondary T2 a fluctuating electro-motive force representative of the fluctuating component of the current through primary T1. This fluctuating electromotive force opposes the biasing potential 75 to permit a fluctuating current to traverse the plate circuit of valve 76. This current traverses field winding 74 and effects rotation of motor 73 in the direction opposite to that previously described, since the current traversing winding 72 is of insufficient magnitude to oppose the current in winding 74 to prevent rotation of the motor.

In Fig. 5 there is shown a system adapted to operate on either continuous, or fluctuating control current of predetermined frequency, wherein the power tube 49, connected as in the previous instances to the photo-electric cell circuit, has included in its plate circuit networks for selectively passing the control current through field windings of a single motor. A filter circuit comprising an inductance 80 and a capacitance 81 connected in parallel with each other forming a parallel resonant circuit and a circuit known as a $\pi$ filter comprising inductance 82 and capacitances 83 is connected in series with a field winding 84 of a motor. A coupling resistance 85 is connected across the circuit above described, and coacts with a condenser 86 to prevent change of potential of grid 87a of tube 87 by a D. C. potential across the coupling resistance. A grid biasing resistance potential serves to shut off flow of current in the plate circuit 89 of tube 87 in the absence of a fluctuating electro-motive force acting on the grid. The plate circuit of tube 87 comprises a field winding 90 of a motor of the double field reversible type (not shown), which tends to rotate the motor when energized in a direction opposite to that produced by field winding 84.

The operation is as follows:—

During the period when the photo-electric cell is dark, the grid biasing potential 70 shuts off current in the plate circuit of tube 49 so that the field windings 84 and 90 both remain de-energized. When the photo-electric cell, however, is subjected to a continuous beam of light, a substantially direct current will flow in the plate circuit of tube 49 through the circuit comprising the parallel resonant and $\pi$ filters and field coil 84. Field coil 84 being energized accordingly tends to rotate the motor (not shown) in a given direction. When a substantially continuous current is flowing in the plate circuit above referred to, field coil 90 will remain de-energized since the direct current cannot pass condenser 86 to affect the grid biasing potential of tube 87. When the beam of light directed on the photo-electric cell is fluctuating in intensity, as when passing through apertures 71, the current set up in the plate circuit of tube 49 fluctuates or varies at a corresponding rate, which is fixed. The filter circuits above referred to in the circuit of field winding 84 are adjusted to be in resonance at the frequency of the fluctuating current and so offer maximum impedance to flow of current through field winding 84. Accordingly, the fluctuating component at resonant frequency passes through the coupling resistance 85 and so produces a fluctuating potential on the grid of tube 87. A corresponding fluctuating current is thereupon set up in the plate circuit of tube 87 comprising field winding 90, which is energized to operate the motor in a direction opposite to that previously described.

Figure 6:
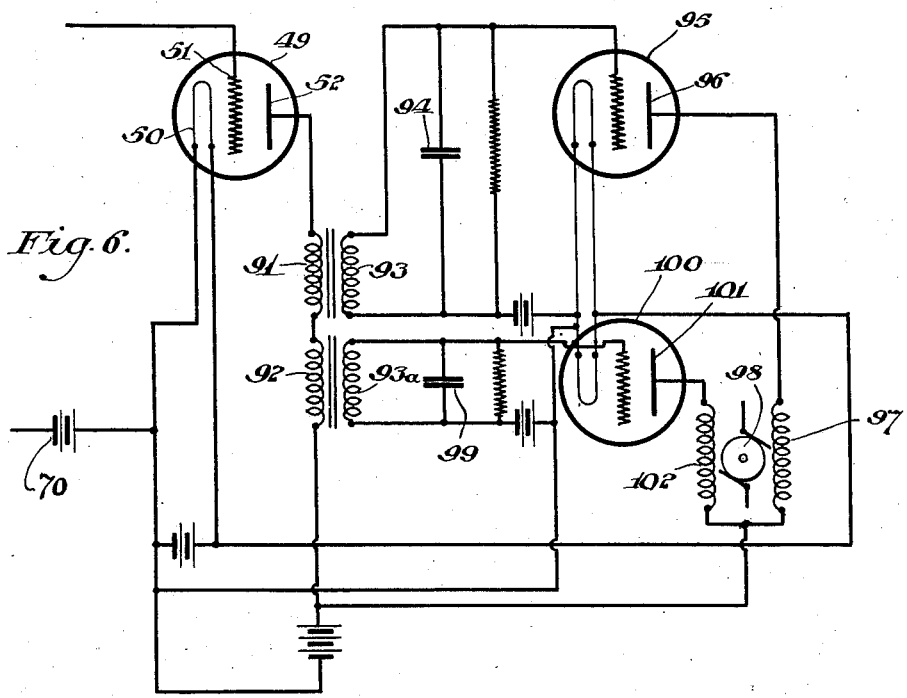
Fig. 6 is a diagrammatic illustration of another modified form of control system.

Fig. 6 illustrates another form of our invention wherein a single motor having reversed field windings, as in the case with Figs. 4 and 5, is adapted to be rotated in either direction by fluctuating currents of different frequencies. Power tube 49 is connected in the manner above described in the photo-electric cell circuit and has included in its plate circuit a pair of primary windings 91 and 92 connected in series with each other, and inductively related to the secondary coils 93 and 93a respectively. The secondary coil 93 comprises an inductance forming with a capacitance 94 a parallel resonant circuit connected in the grid circuit of an electric valve 95. The plate circuit 96 of valve 95 has connected in series therewith a field winding 97 of a motor 98. The secondary winding 93a likewise is connected in parallel with a capacitance 99 forming a parallel resonant circuit connected to the grid of electric valve 100, whose plate circuit 101 has connected in series therewith field winding 102 of motor 98. Field windings 97 and 102 when energized tend to rotate the motor 98 in opposite directions in the manner previously described.

The operation is as follows:—

When the photo-electric cell is affected by a fluctuating beam of light of predetermined frequency, a fluctuating current of like frequency is accordingly set up in the plate circuit of tube 49, including the primary windings 91 and 92. Electro-motive forces of like frequency are therefore set up in the secondary windings 93 and 93a of the transformers. One of the filter circuits has such values of capacitance and inductance that it is resonant at this frequency, thereby applying maximum potential to the grid of the corresponding tube and setting up a plate current to energize the corresponding field winding of the motor. The other circuit, not being in resonance, does not set up appreciable current in the plate circuit of its corresponding tube, so that the field winding connected therein is not energized. In the above described system, the direct current component in the plate circuit of tube 49 is prevented from passing into the motor control circuits, which are selectively energized by fluctuating current of the proper frequency.

Figures 7, 8:
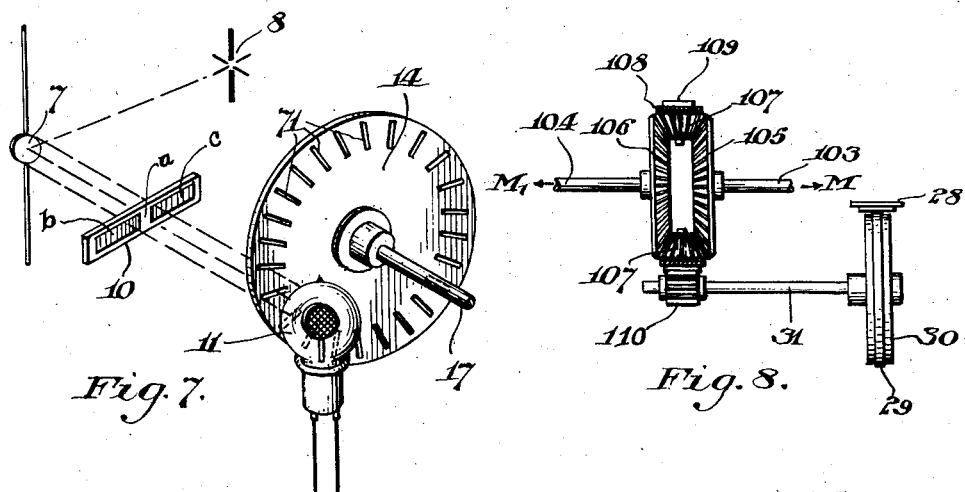
Fig. 7 is a view of a modified form of control apparatus.
Fig. 8 is a view, partly in section, of a further modification of control apparatus.

Referring to Fig. 8, there is shown a modification of our control apparatus wherein differential action is employed to rotate the control shaft when two motors are utilized. In the present instance, motors M and M1 are connected to separate shafts 103 and 104 to which the differential bevel gears 105 and 106 are secured. Bevel pinions 107 mesh with gears 105 and 106 and are rotatably mounted on the inner surface of a ring member 108 having gear teeth or equivalent 109 on the outer face thereof. The slide wire disc shaft 31 has mounted thereon a pinion 110 in mesh with gear teeth 109. The action of the differential gear being well-known, it is simply necessary to state that when shafts 103 and 104 are rotated in opposite directions at equal speed, ring 108 will remain stationary but when the shafts so rotate at unequal speeds ring 108 will rotate in the same direction as the gear which is at higher speed. Accordingly, unequal energization of motors M and M1 produces unequal rates of rotation of the differential gears 105 and 106, resulting in rotation of the ring gear 108 and actuation of the slide wire disc 30 through pinion 110. The differential mechanism above described is particularly adapted for electric motors whose torque is small, and wherein the difference in torque available to rotate the motor shaft, as when the motors are connected in opposition to the same shaft, would be barely able to overcome the friction of the moving parts. By utilizing the differential method, however, the motors are individually energized by a sufficiently large current to insure rotation.

It should be understood that the condition in response to variation in whose magnitude a control is to be effected, may be either thermal, electrical, physical, chemical, etc., and that we are not limited to the specific method or means herein disclosed for obtaining deflection of the reflecting member.

It should be further understood that the control motor or motors may be readily adapted to actuate, through shaft 31 for example, means for controlling the magnitude of the condition.

What we claim is:

1. In a system for effecting a control in response to change in magnitude of a condition, the method which comprises producing an electric current whose frequency is dependent upon the sense of change in the magnitude of said condition, and selectively directing said current through one of a plurality of circuits for effecting a control.

2. In a system for effecting a control in response to change in magnitude of a condition, the method which comprises producing a fluctuating electric current dependent in magnitude and frequency upon the extent and sense of change in magnitude of said condition respectively, and selectively directing said current, according to its frequency, through one of a plurality of circuits for effecting a control.

3. In a system for effecting a control in response to change in magnitude of a condition, the method which comprises producing a fluctuating electric current dependent in frequency upon the sense of change in magnitude of said condition amplifying said current, and selectively directing said current according to its frequency, through one of a plurality of circuits for effecting a control.

4. In a system for effecting a control in response to change in magnitude of a condition, the method which comprises varying a resistance in an electric circuit to produce a fluctuating electric current dependent in frequency upon the sense of change in magnitude of said condition and selectively directing said current through one of a plurality of circuits for effecting a control.

5. In a system for effecting a control in response to change in magnitude of a condition, the method which comprises producing a pulsating beam of radiant energy, varying the rate of the pulsations in accordance with the sense of change of magnitude of said condition, effecting variations in an electric current corresponding in time with said pulsations, amplifying said current, and selectively directing said current through one of a plurality of circuits for effecting a control.

6. In a system for effecting a control in response to change in magnitude of a condition, the method which comprises producing a pulsating beam of radiant energy, varying the intensity and frequency of the pulsations in accordance with the extent and sense of change in magnitude of said condition respectively, effecting variations in an electric current corresponding in time with said pulsations and proportional in magnitude thereto, amplifying said current, and selectively directing said current through one of a plurality of circuits for effecting a control.

7. In a system for effecting a control in response to change in magnitude of a condition, the method which comprises producing an electric current, varying the resistance of a light-sensitive cell in the circuit traversed by said current to produce fluctuations in the magnitude of current, the magnitude and frequency of said fluctuations being representative of the extent and sense of change in magnitude of said condition respectively, and selectively directing said current through control circuits.

8. A system for effecting a control in response to change in magnitude of a condition comprising means for producing an electric current, means for producing fluctuations in said current at a rate dependent upon the sense of change in magnitude of said condition, means for amplifying said current, means for causing said amplified current to flow through one of a plurality of circuits, and electromagnetic means selectively traversed by current for effecting a control.

9. A system for effecting a control in response to change in magnitude of a condition comprising means for producing an electric current, means for producing fluctuations in said current at a rate dependent upon the sense of change in magnitude of said condition, filter circuits selectively traversed by said current, and electromagnetic means traversed by current in said circuits for actuating control apparatus.

10. A system for effecting a control in response to change in magnitude of a condition comprising means for producing an electric current, means for producing fluctuations in said current at a rate dependent upon the sense of change in magnitude of said condition, a plurality of circuits in parallel resonant at different frequencies selectively traversed by the fluctuating component of said current, and electromagnetic means traversed by said current component for actuating control apparatus.

11. Control apparatus comprising a source of light, deflecting means responsive to change in magnitude of a condition for directing a beam of light from said source upon a light-sensitive cell, means for varying the intensity of said beam in accordance with the extent of deflection of said first-named means, means for producing pulsations in said beam at a rate dependent upon the direction of deflection of said first-named means with respect to a neutral position, and electrical control circuits connected to said light-sensitive cell.

12. Control apparatus comprising a deflecting member, reflecting means associated with said member for directing a beam of radiant energy upon a variable resistance cell included in an electric circuit, and means for producing pulsations in said beam at a rate dependent upon the direction of deflection of said member whereby there is produced a fluctuating current in said circuit.

13. Control apparatus comprising means for producing an electric current having direct and fluctuating components, the fluctuating component varying in frequency and magnitude in accordance with change in the condition to be controlled, a transformer circuit for separating the varying fluctuating component from the direct component comprising a plurality of series resonance circuits adjusted for selective reception of the said fluctuating component, and electromagnetic control means in each of said circuits adapted to be energized by current traversing the same.

WLADIMIR A. REICHEL.
ATHERTON H. MEARS.